US 7,943,904 B2

(12) United States Patent
Ouvrier-Buffet

(10) Patent No.: US 7,943,904 B2
(45) Date of Patent: May 17, 2011

(54) BISPECTRAL DETECTION DEVICE AND BISPECTRAL DETECTOR COMPRISING SAID DEVICE

(75) Inventor: Jean-Louis Ouvrier-Buffet, Sevrier (FR)

(73) Assignee: Commissariat a l'Energie Atomique, Paris (FR)

(*) Notice: Subject to any disclaimer, the term of this patent is extended or adjusted under 35 U.S.C. 154(b) by 0 days.

(21) Appl. No.: 12/622,521

(22) Filed: Nov. 20, 2009

(65) Prior Publication Data
US 2010/0065744 A1 Mar. 18, 2010

Related U.S. Application Data

(63) Continuation of application No. PCT/FR2008/051128, filed on Jun. 23, 2008.

(30) Foreign Application Priority Data

Jul. 26, 2007 (FR) .................................... 07 05478

(51) Int. Cl.
*H01L 25/00* (2006.01)
*G01J 5/02* (2006.01)
(52) U.S. Cl. ...................... 250/332; 250/330; 250/338.1; 250/353
(58) Field of Classification Search ........ 250/330–339.05
See application file for complete search history.

(56) References Cited

U.S. PATENT DOCUMENTS

| 5,808,350 | A | * | 9/1998 | Jack et al. ...................... 257/440 |
| 6,023,061 | A | * | 2/2000 | Bodkin ........................... 250/332 |
| 6,320,189 | B1 | | 11/2001 | Ouvrier-Buffet |
| 2007/0045541 | A1 | * | 3/2007 | Urey et al. .................. 250/338.3 |
| 2007/0187603 | A1 | * | 8/2007 | Jankowiak ................. 250/338.1 |
| 2009/0173883 | A1 | * | 7/2009 | Kauffman et al. .......... 250/338.4 |

OTHER PUBLICATIONS

A. Mens et al., "*X-UV Imaging With Backside Illuminated CCDs in Laser-Matter Interaction Experiments,*" J. Optics (Paris), 1993, vol. 24, No. 3, pp. 129-134.
Reich, Robert K., "*Sub-Poisson Statistics Observed in an Electronically Shuttered and Back-Illuminated CCD Pixel,*" IEEE Transactions on Electron Devices, vol. 44, No. 1, Jan. 1997, pp. 69-73.

* cited by examiner

*Primary Examiner* — David P Porta
*Assistant Examiner* — Casey Bryant
(74) *Attorney, Agent, or Firm* — Burr & Brown

(57) ABSTRACT

The present invention relates to a bispectral detection device, particularly of an infrared radiation and a visible radiation, including a monolithic substrate; an array of bolometric micro-bridges sensitive to infrared radiation, the bolometric micro-bridges being suspended over a first face of the substrate by means of support and connection arms; and an array of photoelectric elements fowled in the substrate, and sensitive to visible radiation, the bolometric micro-bridges and the photoelectric elements being stacked. According to the invention, the substrate portion between the photoelectric element array and a second face of the substrate, opposite to the first face thereof, is thinned so that the photoelectric elements are capable of detecting a visible radiation incident on the second face.

14 Claims, 4 Drawing Sheets

BISPECTRAL DETECTION DEVICE AND BISPECTRAL DETECTOR COMPRISING SAID DEVICE

FIELD OF THE INVENTION

The present invention relates to the field of bispectral imaging, and more particularly to infrared imaging and visible light imaging implemented by means of an array of bolometric elements and an array of photoelectric elements respectively.

BACKGROUND OF THE INVENTION

Given the non-existence of a material capable of efficiently detecting both an infrared radiation and a visible radiation, bispectral detection in these two spectral bands is usually achieved by means of two sensors. Each sensor is dedicated to a particular radiation type and is placed in a specific optical path.

In fact, this type of bispectral detector requires an adjustment of the optical centers and axes of the two optical paths to ensure that the sensors observe the same scene.

This type of adjustment, denoted by the term "spatial harmonization", is generally quite tricky. Moreover, it needs to be repeated on a regular basis on account of vibrations or impacts sustained by the detector, which misalign the optical paths.

To overcome this drawback, a bispectral detector has been designed wherein a photoelectric element array is positioned underneath a bolometric micro-bridge array, to form a bispectral detection element array. Such a detector is described for example in the document U.S. Pat. No. 6,320,189.

This detector, whereof one bispectral detection element is shown in FIG. 1, includes a CMOS or CCD multiplexer circuit 1, formed in a substrate, an insulating layer 2 covering the circuit 1, and a bolometric micro-bridge 4 for detecting the infrared radiation.

The micro-bridge 4 includes a thin bolometric layer 9, made absorbent to infrared radiation, electrodes 7, extended by thermal insulation arms 8, and supports 5 of the layer 9 and electrodes 5, providing support thereto and electrically connecting the electrodes 7 to the multiplexer circuit 1 via metal connections 6.

A reflecting layer 3 is also provided underneath the layer 9, to form therewith a quarter-wave plate, increasing the sensitivity of the bolometric detector to infrared radiation.

A photoelectric element 10, sensitive to visible radiation, such as a photodiode or a phototransistor for example, is formed furthermore in the substrate of the multiplexer circuit 1 and placed under the micro-bridge 4.

The thin bolometric layer 9, the electrodes 7, the reflecting layer 3 and the insulating layer 2 are made out of materials that are at least partially transparent to visible radiation in order to let through some of this radiation so that it is detected by the photoelectric element 10.

The detector so constituted is placed in the focal plane of an optic, with the micro-bridges 4 placed towards the optic.

A radiation comprising an infrared (IR) component, and a visible (VIS) component and incident, via the optic, on the detector on the micro-bridge 4 side, then sees its IR component picked up thereby, while the VIS component part, which has successfully penetrated as far as the photoelectric element 10, is picked up by the latter.

Thus, for this type of bispectral detector, a single optical path is necessary and all the problems associated with spatial harmonization are avoided.

However, this type of detector suffers from intrinsic faults which are detrimental to the quality of the bispectral detection.

Indeed, some of the visible radiation is necessarily absorbed by the materials constituting the bolometric detector. Visible light detection efficiency is thus weakened.

Moreover, it is necessary to choose for the bolometric detector materials that are at least partially transparent to visible radiation. In fact said choice of material is not necessarily optimum for the detection of IR radiation.

Furthermore, this type of stacked array detector requires a quality, and therefore expensive, optic, in order to be able to focus the infrared or visible radiation in the restricted area of the space containing the two arrays.

Lastly, since the photoelectric element array and the micro-bridge array are formed in different planes that may be more than three micrometers apart in some applications, it is difficult to focus at the same time on both arrays using a single optic. The result of this is therefore a loss in terms of resolution.

The purpose of the present invention is to resolve the aforementioned problems by proposing a bispectral detector that does not require one optical path per detection type, while providing optimum efficiency and resolution for each detection type.

SUMMARY OF THE INVENTION

To this end, the object of the invention is a bispectral detection device, particularly of infrared radiation and visible radiation, including:
  a monolithic substrate;
  an array of bolometric micro-bridges sensitive to infrared radiation, the bolometric micro-bridges being suspended over a first face of the substrate by means of support and connection arms; and
  an array of photoelectric elements made in the substrate, and sensitive to visible radiation, the bolometric micro-bridges and the photoelectric elements being stacked.

According to the invention, the substrate portion between the photoelectric element array and a second face of the substrate, opposite to the first face thereof, is thinned so that the photoelectric elements are capable of detecting a visible radiation incident on the second face.

In other words, visible light detection is made possible via the rear face of the device. Visible radiation does not therefore pass through the materials constituting the bolometric detector and is not therefore attenuated thereby before being detected. Moreover, no extraneous heating of the bolometric detector can thus be caused.

According to particular embodiments, the device comprises one or more of the following features:
  for a silicon substrate, the thickness of said thinned portion of the substrate is about 15 micrometers;
  it comprises a micro-lens array placed on the second face of the substrate, each micro-lens being arranged opposite a photoelectric element;
  it includes an encapsulation enclosure in which are encapsulated at least the substrate and the arrays for the detection of infrared radiation and visible radiation respectively, and whereof each face opposite an array is transparent at least to the radiation to which the array under consideration is sensitive, said face comprising a filter for selecting the radiation to which the array is sensitive;

the internal space of the encapsulation enclosure is placed in a vacuum or under a controlled poorly heat conductive atmosphere; and a reflecting layer is provided underneath each bolometric micro-bridge.

Another object of the invention is a bispectral detector of magnetic radiation, which, according to the invention, preferably includes:

a device of the aforementioned type; and optical means capable of directing and focusing onto one array of the device at least some of the radiation incident on the other array of the device.

In other words, some of the radiation incident on a face of the device is redirected and focused onto the other face of the device.

Additionally, the two faces detect, for each point of the scene observed, the visible and infrared components coming from this point. There is therefore only one optical path for two different detections, which gives the device space-time coherence.

Furthermore, it becomes possible to use an optical focusing system for each array, and therefore to define two different planes of focus.

According to particular embodiments, the detector comprises one or more of the following features:

the optical means include a concave mirror, the array being arranged in a focal plane of the concave mirror;

the detector comprises means of adjusting the position of the array;

the detector comprises means for selecting the electromagnetic radiation to which the array is sensitive, said means being placed on an optical path thereto;

the optical means form the bottom of the general enclosure into which the aforementioned detection device is placed, the top of the enclosure being at least partially transparent to infrared radiation and at least partially transparent to visible radiation; advantageously, the top of the enclosure comprises an optic for focusing the radiation to which one of the arrays is sensitive, arranged opposite thereto, and, juxtaposed to the optic, a filter for selecting the radiation to which the array is sensitive, arranged opposite the optical focusing means;

the internal space of the enclosure is placed in a vacuum or under a controlled poorly heat conductive atmosphere.

BRIEF DESCRIPTION OF THE DRAWINGS

The invention will be better understood from reading the following description, given solely by way of example, and offered in relation to the appended drawings, wherein identical reference numbers are used to denote identical or similar elements, and wherein.

DETAILED DESCRIPTION OF THE INVENTION

Figure 1:
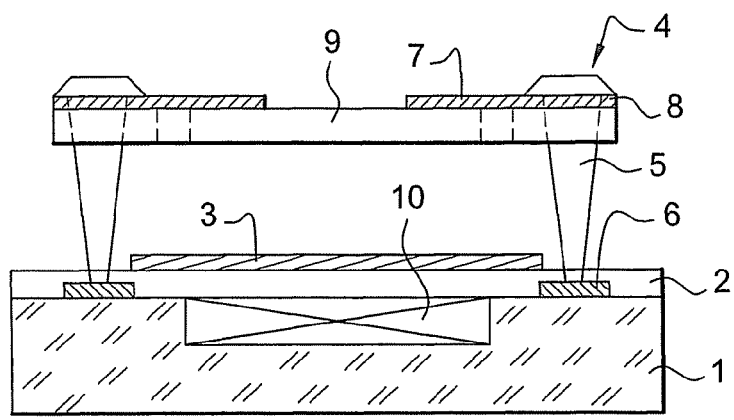
FIG. 1 is a diagrammatic view in cross-section of a prior art bispectral detection element, already described in the pre-characterizing portion of this specification.
Figure 2:
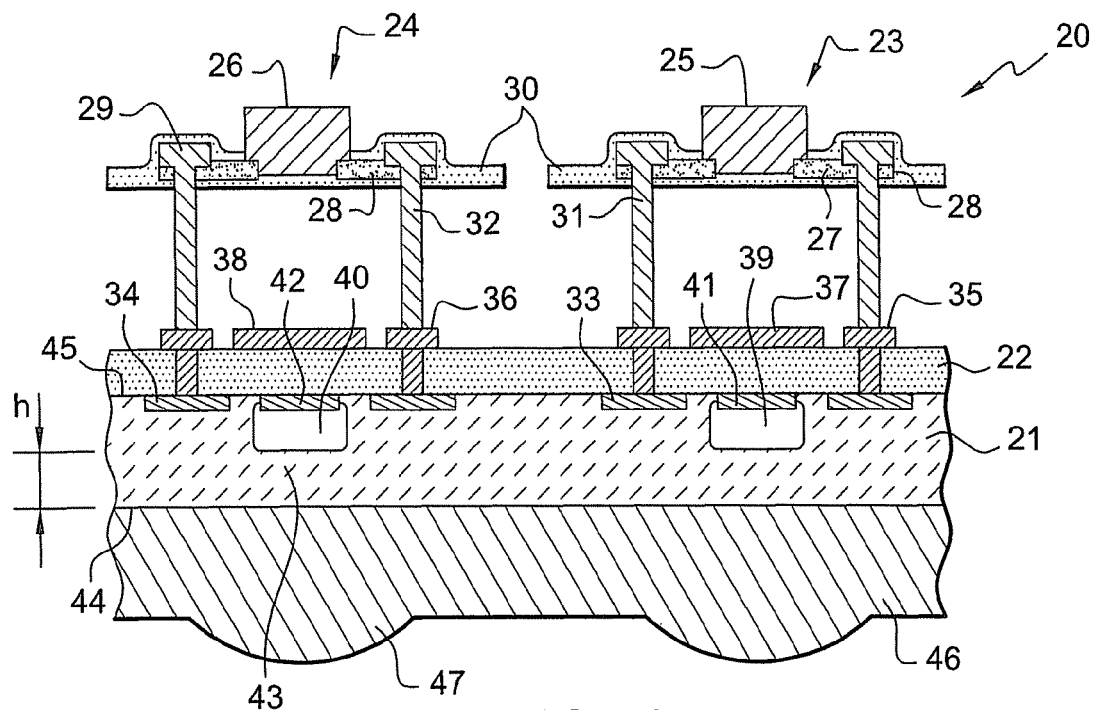
FIG. 2 is a diagrammatic view in cross-section of a first embodiment of the bispectral sensor of the invention.

In FIG. 2, a first embodiment of an IR/VIS bispectral sensor of the invention is shown, which is referred to in its entirety as 20.

Said sensor 20 includes a monolithic silicon substrate 21, in which is implemented a CMOS or CCD multiplexer circuit, an insulating layer 22 covering the circuit 21, and a bolometric micro-bridge array 23, 24 for the detection of infrared radiation.

Each micro-bridge 23, 24 includes a thin bolometric element 25, 26, made absorbent to infrared radiation, electrodes 27, 28 extended by thermal insulation arms 29, the whole being embedded in an insulating layer.

Each micro-bridge 23, 24 also comprises supports 31, 32 of the bolometric element 25, 26, electrodes 27, 28, arms 29 and insulating layer 30, the supports 31, 32 suspending these different elements over the substrate 21.

The supports 31, 32 also make the electrical connection between the electrodes 27, 28 and terminals 33, 34 of the multiplexer circuit formed in the substrate 21, via metal connections 35, 36 passing through the insulating layer 22.

A reflecting layer 37, 38 is also provided underneath each bolometric element 25, 26 to form therewith a quarter-wave plate, increasing, in a known way, the sensitivity of the bolometric detector to infrared radiation.

The bolometric micro-bridge array 25, 26 is stacked over an array of photoelectric elements 39, 40, sensitive to visible radiation, such as a photodiode array or a phototransistor array for example. Said photosensitive component array is made in the mass of the substrate 21.

The photoelectric element array 39, 40 comprises, for each micro-bridge 25, 26, a photoelectric element placed thereunder and in contact with a metal connection 41, 42 connecting it to the multiplexer circuit.

The multiplexer circuit formed in the substrate 21 performs the read functions of the micro-bridge and photoelectric element arrays, as is the case of the detector in the document U.S. Pat. No. 6,320,189.

The substrate portion 43 located between the photoelectric elements 39, 40 and the face of the substrate 44, opposite the face 45 on which the micro-bridge array 25, 26, is formed, is thinned to a thickness h. For the detection of visible light and where a silicon (Si) substrate is involved, said thickness h is 15 micrometers or less. The substrate portion 43 thus allows the charge carriers created by a visible radiation illuminating the face 44 of the substrate 21 to get back to the photoelectric elements.

The photoelectric element array 39,40, the electrical connections 41, 42 thereof, the multiplexer circuit in the substrate 21 and the substrate portion 43 thus form a type of visible "back-illuminated" sensor, the efficiency of which has been demonstrated in numerous documents, such as for example the document "*X-UV imaging with backside illuminated CCDs in laser-matter interaction experiments*" by A. Mens et al., J. Optics, 1993, vol. 24, no. 3, pages 129-134, or the document "*Sub-poisson statistics observed in an electronically shuttered and back illuminated CCD pixel*", by R. K. Reich, IEEE Transactions on electron device, vol. 44, no. 1, January 1997.

Lastly, the sensor 20 of the invention further comprises a micro-lens array 46, 47, including, for each photoelectric element 39, 40, a micro-lens arranged on the face 44 of the substrate 21 opposite the photoelectric element. The effect of said micro-lens is to concentrate onto the photoelectric element a visible radiation that illuminates it. This compensates for the reduction in sensitive surface of the element resulting from the presence of complex addressing electronics in the substrate for reading the micro-bridge and photosensitive element arrays. The fill factor associated with the detection of visible radiation is therefore improved.

Optionally, the surface of the micro-lens array 46, 47 is coated with a layer forming a filter for the selection of the visible spectrum of a radiation incident thereon.

To advantage, the materials constituting the bolometric micro-bridge array are chosen optimally with a view to the detection of infrared radiation, without taking the visible detection into account.

Figure 3:
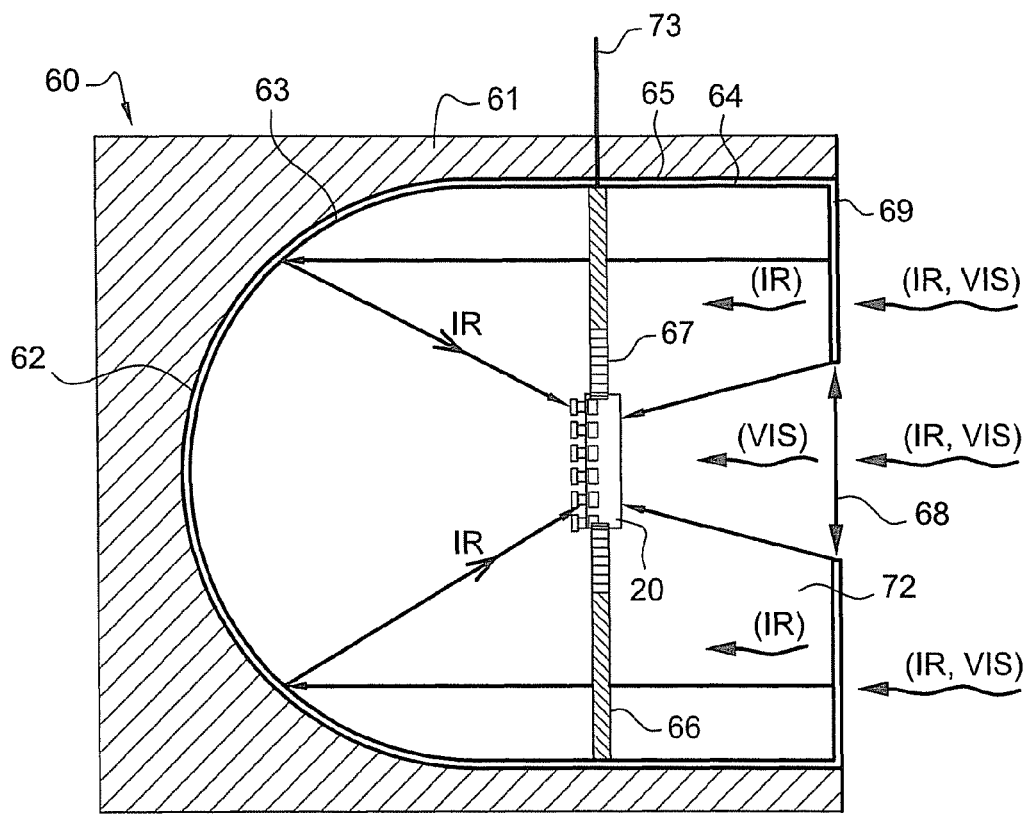
FIG. 3 is a diagrammatic view in cross-section of a bispectral detector of the invention including the sensor in FIG. 2.

In FIG. 3, a non-cooled detector 60 incorporating the bispectral sensor 20 of the invention is shown.

The detector 60 comprises a general enclosure 61, whereof the bottom 62 is constituted by a concave mirror 63 coated with a metal layer. On the other hand, in the non-focusing parts of the mirror, the lateral walls 64 are coated with an absorbent coating 65, for example black, to avoid extraneous reflections.

The bispectral sensor 20 is for its part arranged in the enclosure 61 with the bolometric micro-bridge array opposite the concave mirror 63 and in a focal plane thereof.

The sensor 20 is held in place mechanically by means of support arms 66, which optically center the bolometric micro-bridge array in the focal plane of the mirror 63, cushion the vibrations sustained by the enclosure 61, thermalize the bolometric micro-bridge array, and provide an electric connection 73 outwards.

To advantage, the support arms 66 comprise a self-focusing system based on a voltage-supplied piezoelectric element 67, thereby allowing the position of the micro-bridge array to be adjusted so that it coincides substantially with the focal plane of the concave mirror 63.

The detector 60 further comprises an optic 68 hermetically mounted in an infrared filter 69, which hermetically seals the enclosure 61. The function of the optic 68 is for its part to focus the visible component of a radiation on the photoelectric element array of the sensor 20.

The internal space 72 of the enclosure 61 is for its part placed in a vacuum, or under a controlled non-heat conductive atmosphere, in order to thermally insulate the bolometric micro-bridge array. Said array is therefore substantially heated only by an infrared radiation that illuminates it. The enclosure optionally comprises a getter formed of a substance introduced into the internal space 72 in order to accentuate the vacuum by a chemical or physical action upon the residual gases in the space 72.

In operation, the detector 60 is illuminated by a scene to be observed. The visible component of the scene is then focused by the optic 68 on the plane of the photoelectric element array of the bispectral sensor 20, which detects said component on account of the thinned layer of substrate.

The infrared component of the observed scene is for its part selected by the infrared filter 69 and passes into the enclosure 69. The infrared component is then redirected and focused by the concave mirror 63 on the plane of the bolometric micro-bridge array of the bispectral sensor 20.

Bispectral detection is thus performed by an illumination of the two faces of the sensor 20, each face thereof being dedicated to one specific radiation type.

Quite obviously, the system may be inverted to have the photosensitive element array opposite the mirror.

It will be further noted that the optical system associated with the detection of visible radiation (optic 68) and the optical system associated with the detection of infrared radiation (infrared filter 69 and concave mirror 63) share the same optical axis. Thus, there is only one single optical path and no harmonization problem arises as is the case with some prior art detectors.

Figure 4:
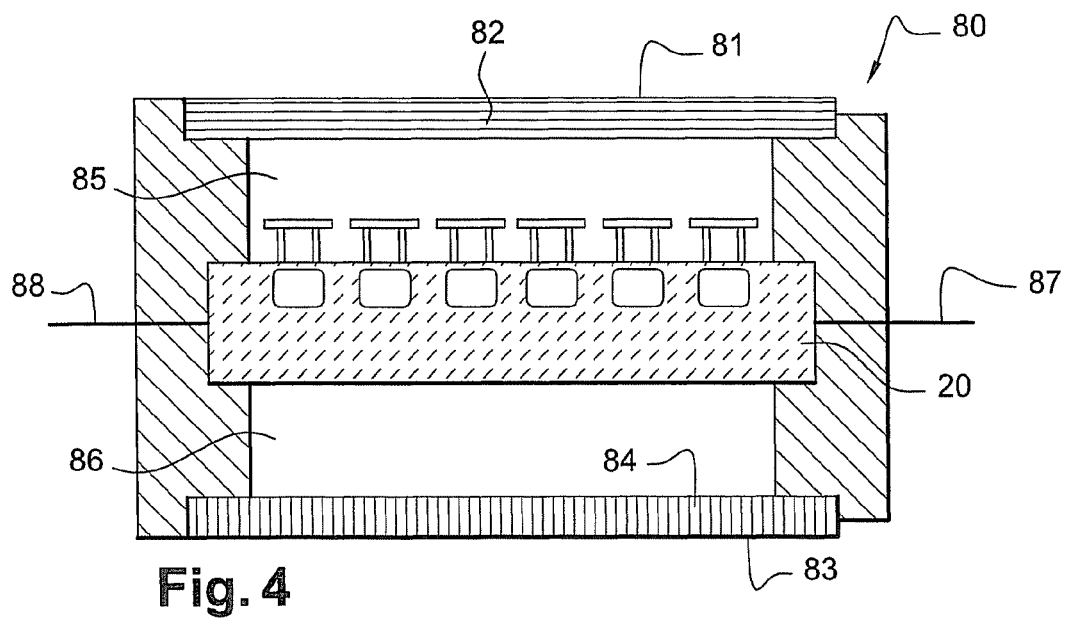
FIG. 4 is a diagrammatic view in cross-section of a second embodiment of the bispectral sensor of the invention.
Figure 6:
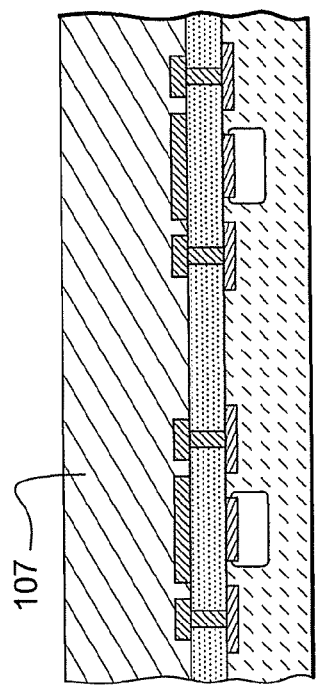
FIGS. 5 to 11 illustrate a method of manufacturing the bispectral sensor of the invention.
Figure 8:
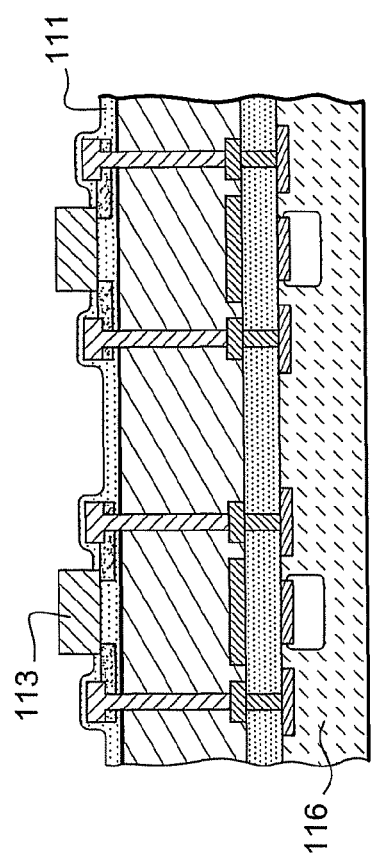
Figure 5:
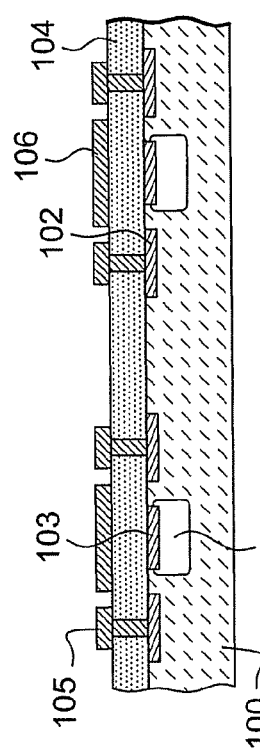
Figure 7:
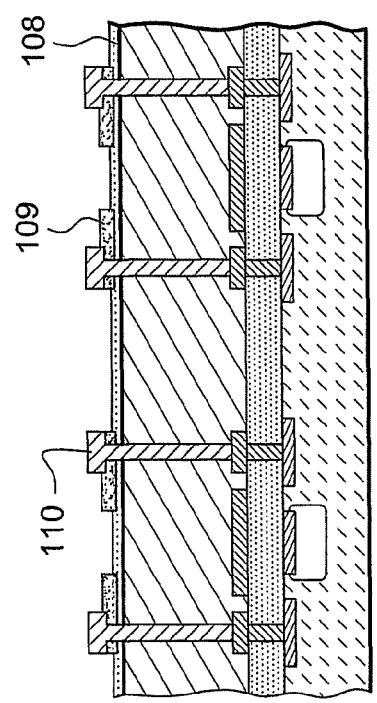
Figure 9:
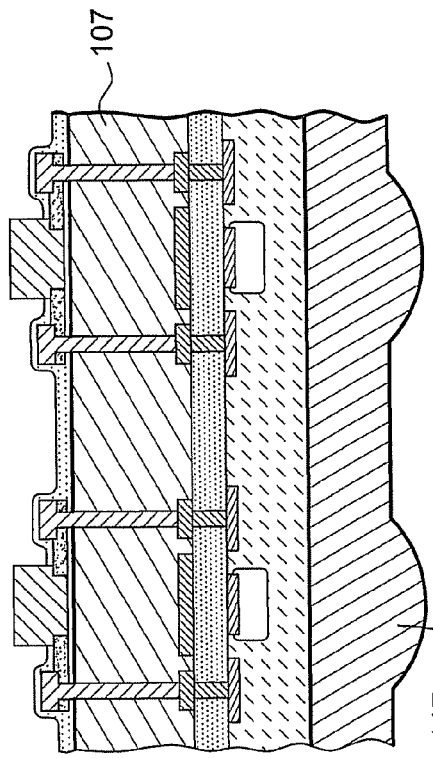
Figure 10:
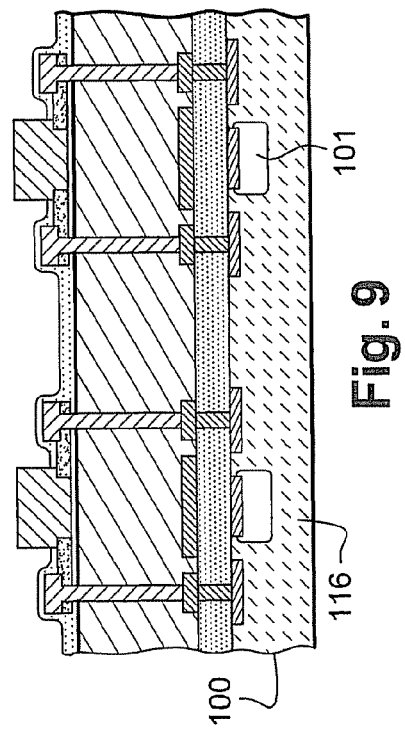
Figure 11:
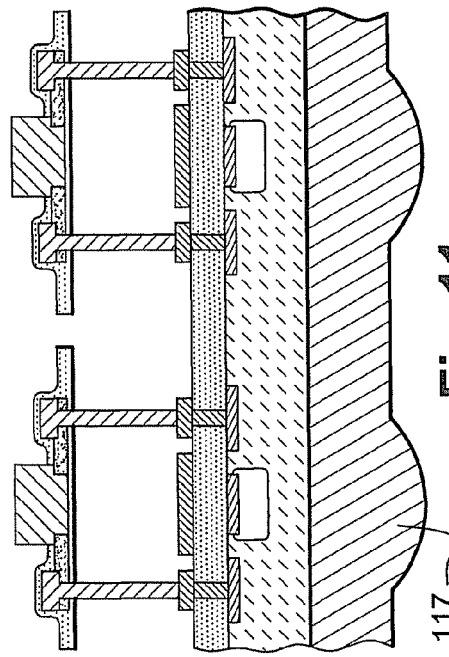

In FIG. 4, a second embodiment of the bispectral sensor of the invention is shown.

This embodiment is identical to the bispectral sensor 20 described in relation to FIG. 2 except that it further comprises a hermetic enclosure 80 in which the sensor 20 is encapsulated, a so-called "encapsulation" enclosure.

The face 81 of the encapsulation enclosure 80 opposite the bolometric micro-bridge array comprises an infrared filter 82, while the face 83 of the enclosure 80 opposite the photoelectric element array comprises a visible filter 84. Said filters 82, 84 are optimized by finding a compromise between transparency and selectivity.

The internal space 85, 86 of the enclosure 80 is furthermore placed in a vacuum, or under a controlled atmosphere of a poorly heat conductive gas, such as a heavy gas like xenon (Xe) for example. The internal space 85, 86 optionally comprises a getter.

Lastly, electrical connections 87, 88 are furthermore provided in the enclosure 80 to connect the sensor 20 with circuits external to the enclosure 80.

The advantage of the second embodiment is that it provides an infrared/visible bispectral sensor which can be adapted in numerous detectors. Indeed, it is not then necessary to provide a detector enclosure 61 in which a vacuum is formed, or even radiation selection filters, since the vacuum and radiation selection have already been implemented.

FIGS. 5 to 11 illustrate a method of manufacturing the bispectral detector of the invention.

The method preferably includes:
producing in a monolithic P type silicon substrate 100 a multiplexer circuit leaving a circuitless volume array:
forming (by ion implantation of an N type dopant on the surface of the P type silicon substrate) in the vacant volume spaces photosensitive elements 101, such as photodiodes or phototransistors;
depositing (by cathode sputtering, by thermal decomposition or by plasma) and engraving (by chemical etching or by plasma) on the surface of the substrate 100, electrical terminals 102, 103 necessary to the bolometric micro-bridges and photosensitive elements;
depositing (by chemical vapor deposition, or CVD) the insulating layer 104 and forming by deposition (by cathode sputtering, by thermal decomposition or by plasma) and engraving (by chemical etching or by plasma) one or more metal materials to form the electrical connections 105 of the micro-bridges and reflecting metal layers 106;
laying a sacrificial layer 107 about two micrometers thick for the detection of thermal infrareds (with a wavelength of 8 to 14 micrometers);
depositing (by CVD) an insulating material 108, and then depositing (by cathode sputtering, by thermal decomposition or by plasma) and engraving (by chemical etching or by plasma) a metal layer 109 of 50 to 100 angstroms, preferably made of titanium nitride (TiN), in order to form the electrodes;
depositing (by cathode sputtering, by thermal decomposition or by plasma) and engraving (by chemical etching or by plasma) metallized parts 110 to form the support and connection elements between the micro-bridges and the multiplexer circuit formed in the substrate 100;
depositing (by CVD) an additional layer of insulating material 111 and making contact openings that subsequently allow contact between the metallized parts 110 and the material 113;
depositing (by cathode sputtering, by thermal decomposition or by plasma) and engraving (by chemical etching or by plasma) an amorphous or polycrystalline semiconductor material 113 (Si, Ge, a-SiC:H, a-SiGe:H or ferrite) of no great thickness (0.005 micrometers to 1 micrometer) to form the bolometric elements;

engraving thermal insulation arms and separating unitary detection elements;

thinning (by chemical etching) the free portion 116 of the substrate 100 until a predetermined thickness is reached in order to allow the photocharges to reach the collect region of the photosensitive elements 101; and forming the micro-lens array 117; and engraving the sacrificial layer 107 supporting the bolometric stack.

The metallized parts and electrical connections are made by depositing and engraving layers, of a thickness of between about 0.005 micrometers and about 1 micrometer, made out of at least one of the following materials: titanium (Ti), titanium nitride (TiN), platinum (Pt), aluminum (Al), paladium (Pd), nickel (Ni), nickel and chrome alloy (NiCr), tungsten and silicon alloy (WSi).

The invention claimed is:

1. A bispectral detector of an electromagnetic radiation, particularly of an infrared radiation and a visible radiation, comprising:
    an enclosure with a face for receiving said electromagnetic radiation;
    a bispectral detection device placed within the enclosure, and comprising
        a monolithic substrate,
        an array of bolometric micro-bridges sensitive to infrared radiation, the bolometric micro-bridges being suspended over a first face of the substrate by support and connection arms, and
        an array of photoelectric elements formed in the substrate, and sensitive to visible radiation,
        wherein the bolometric micro-bridges and the photoelectric elements are stacked,
        wherein a substrate portion between the array of photoelectric elements and a second face of the substrate, opposite to the first face thereof, is thinned so that the photoelectric elements can detect a visible radiation incident on the second face, and
        wherein said device is arranged so that at least some of a radiation incident on said face of the enclosure is incident on one of said array of bolometric micro-bridges and said array of photoelectric elements; and
    optical means arranged in the enclosure and capable of directing and focusing on the other one of said array of bolometric micro-bridges and said array of photoelectric elements at least some of said radiation incident on said face of the enclosure only along an optical path that does not pass through said device.

2. The bispectral detector as claimed in claim 1, wherein the substrate of said device is made of silicon, and wherein the thickness of the substrate of said device is about 15 micrometers.

3. The bispectral detector as claimed in claim 1, wherein said device comprises an array of micro-lenses placed on the second face of the substrate, each micro-lens being arranged opposite a photoelectric element.

4. The bispectral detector as claimed in claim 1, wherein said device includes an encapsulation enclosure in which are encapsulated at least the substrate and the arrays, and whereof each face opposite the array is transparent at least to the radiation to which the array opposite to said each face is sensitive.

5. The bispectral detector as claimed in claim 4, wherein said each face comprises a selection filter of the radiation to which an array opposite said each face is sensitive.

6. The bispectral detector as claimed in claim 4, wherein the internal space of the encapsulation enclosure is placed in a vacuum, or under a controlled non-heat conductive atmosphere.

7. The bispectral detector as claimed in claim 1, wherein a reflecting layer is provided underneath each bolometric micro-bridge.

8. The bispectral detector as claimed in claim 1, wherein the optical means comprises means for adjusting the position of said other one of said array of bolometric micro-bridges and said array of photoelectric elements.

9. The bispectral detector as claimed in claim 1, wherein the optical means comprises means for selecting the electromagnetic radiation to which said other one of said array of bolometric micro-bridges and said array of photoelectric elements is sensitive, placed on an optical path thereto.

10. The bispectral detector as claimed in claim 1, wherein the optical means forms the bottom of the enclosure into which the bispectral detection device is placed, the top of the enclosure being at least partially transparent to infrared radiation and at least partially transparent to visible radiation.

11. The bispectral detector as claimed in claim 10, wherein the top of the enclosure comprises an optic for focusing the radiation to which said one of the of said array of bolometric micro-bridges and said array of photoelectric elements is sensitive, arranged opposite thereto, and, juxtaposed to the optic, a selection filter of the radiation to which said other one of said array of bolometric micro-bridges and said array of photoelectric elements is sensitive that is arranged opposite to the optical focusing means.

12. The bispectral detector as claimed in claim 10, wherein the inner space of the enclosure is placed in a vacuum or under a controlled non-heat conductive atmosphere.

13. The bispectral detector as claimed in claim 1, wherein the inner space of the enclosure is non-cooled.

14. A bispectral detector of an electromagnetic radiation, particularly of an infrared radiation and a visible radiation, comprising:
    an enclosure with a face for receiving said electromagnetic radiation;
    a bispectral detection device placed within the enclosure, and comprising
        a monolithic substrate,
        an array of bolometric micro-bridges sensitive to infrared radiation, the bolometric micro-bridges being suspended over a first face of the substrate by support and connection arms, and
        an array of photoelectric elements formed in the substrate, and sensitive to visible radiation,
        wherein the bolometric micro-bridges and the photoelectric elements are stacked,
        wherein a substrate portion between the array of photoelectric elements and a second face of the substrate, opposite to the first face thereof, is thinned so that the photoelectric elements can detect a visible radiation incident on the second face, and
        wherein said device is arranged so that at least some of a radiation incident on said face of the enclosure is incident on one of said array of bolometric micro-bridges and said array of photoelectric elements; and
    a single concave mirror formed by a rear surface of the enclosure for directing and focusing on the other one of said array of bolometric micro-bridges and said array of photoelectric elements at least some of said radiation incident on said face of the enclosure only along an optical path that does not pass through said bispectral detection device.

* * * * *